Sept. 15, 1936. G. W. WAKEHAM 2,054,552
SEED SOWER
Filed Dec. 9, 1933 2 Sheets-Sheet 1
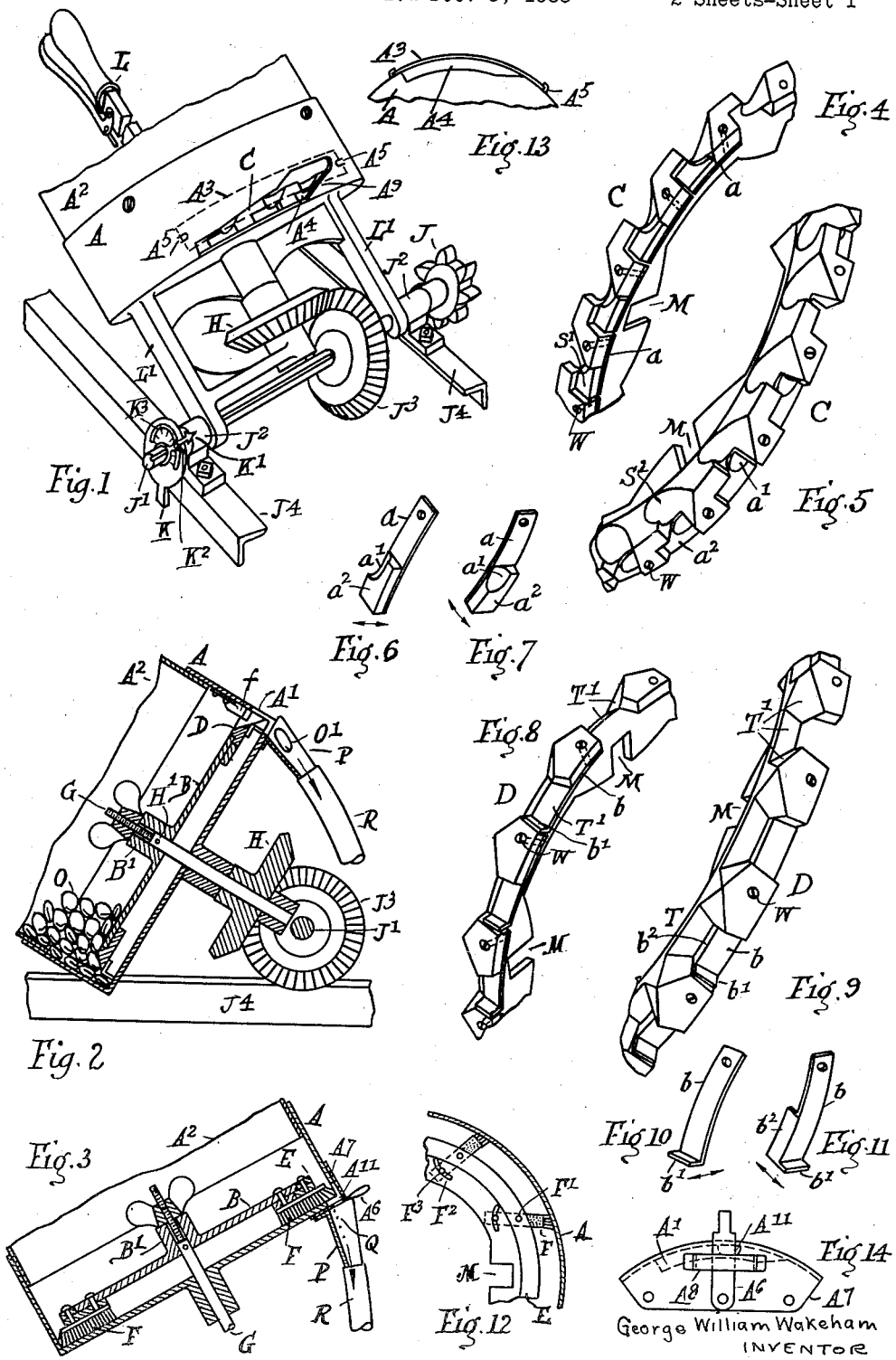
George William Wakeham
INVENTOR Sept. 15, 1936.   G. W. WAKEHAM   2,054,552
SEED SOWER
Filed Dec. 9, 1933    2 Sheets-Sheet 2
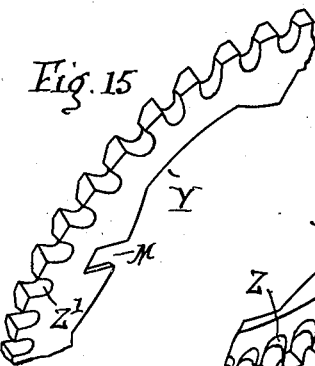
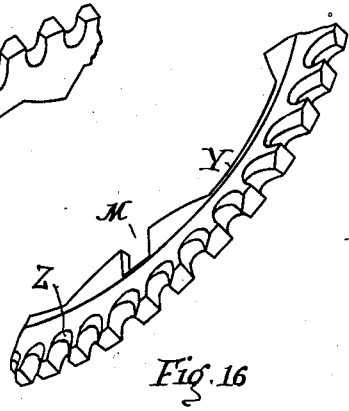
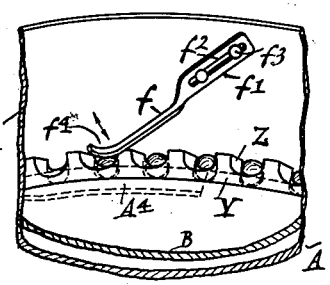
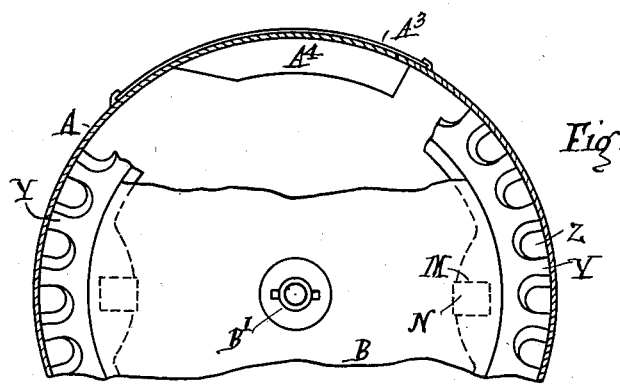
George William Wakeham
INVENTOR
his ATTY.

Patented Sept. 15, 1936

2,054,552

UNITED STATES PATENT OFFICE 2,054,552

SEED SOWER

George William Wakeham, Werribee,
Victoria, Australia

Application December 9, 1933, Serial No. 701,575
In Australia December 21, 1932

4 Claims. (Cl. 221—135)

One object of this invention, which comprises improvements in agricultural sowers, is to provide a machine having improved interchangeable elements by which to sow—spaced apart—seeds of different forms and sizes. The invention is applicable—but it not limited—to small implements used by market gardeners to sow, in rows, vegetable and other seeds of different varieties.

No satisfactory sower is known to me which will separate seeds from a mass in a container or hopper, and discharge them—singly, or practically so—at equal—or about equal—distances apart, to be sown; nor am I aware of any satisfactory prior interchangeable seed conveying wheels or rims any selected one of which may be readily installed at will by a farmer so as to sow seeds of widely different sizes and shapes. Seeds which are small, however, will be sown in small quantities.

An object therefore of my invention is to provide for sowing broad beans, French beans, peas, beet, lettuce, and many other seeds.

I provide interchangeable seed conveying rims which have, or wheels the rims of which have, pockets or recesses of improved shapes, so that when rotated, during seed sowing, seeds do not miss sowing, overcarry, become injured, or choke the recesses, to any substantial extent; waste of seed is thus minimized, and the production of full crops is promoted.

Improved conveying wheels or rims are installed by me in containers or hoppers of suitable size and form, which may have any obviously appropriate minor details, not part of this invention.

The said wheels or rims are set in a plane oblique to vertical; and as they rotate their edges pass through the mass of seeds in the hopper, separate seeds, raise them, and discharge them—when required, singly,—though there may be occasional exceptions.

For sowing some seeds which vary materially in size, as French beans, and broad beans, I provide conveying recesses of variable capacity, the normal capacity being enlarged when a materially larger seed than usual enters a recess, the said enlargement occurring automatically.

Recesses which I provide for conveyance of Canadian Wonder French beans, for example, have been found to have a positioning effect, so that similar surfaces, as the convex faces of these seeds, come to face one way relatively to the recesses. Uniformity of sowing is thus promoted.

One of the interchangeable wheels or rims which I provide is fitted with seed conveying brushes, in order to effectively raise from a mass and deliver from a hopper exit small seeds in small quantities.

The slope of my seed carrier is to be adjusted from time to time during planting according to changes of ground slope. Before planting, the seed carrier is set at a suitable angle according to the kind of seed, and more nearly vertical to plant Canadian Wonder French beans than when large seeds are to be planted.

To allow of adjusting the obliquity of the recessed rim I may mount the hopper or container on pivots or hinges, and adjust its position by means of a lever or its equivalent so that the conveying rims or wheels therein will be sloped according to requirements; or equivalently I make the rims or wheels themselves so adjustable.

I provide an indicator of the aforesaid oblique adjustment, one of its uses arising when variations of ground slope occur during sowing, and alter the slope of the rotating seed conveying wheel or rim. A view of the indicator then conduces to the farmer noting whether to re-adjust the obliquity on the spot to suit the local conditions.

Seed discharge or exit from the hopper will occur by gravity in most cases, but I make added impelling means available at will to ensure such exit.

The seed passes from the hopper into a suitable receiver, as a chute which can supply a tubular conduit having a sowing foot.

To facilitate hopper adjustment on the field it is made movable by providing a handle.

The above mentioned and some other features of this invention are explained herein by the aid of the accompanying drawings.

In these drawings Figure 1 is a perspective view of part of a seed sower, the hopper containing an inclined rotatable member having a suitable—as a circular—rim in which are spaced apart recesses to convey various kinds of seed, one of which is French beans, to the hopper exit, from which it is intended that they shall emerge singly, and this, as a rule, they are found to do.

Figure 2 is a side view in vertical section of part of a seed sower, in the hopper of which is shown a mass of larger seeds, such as broad beans, this hopper containing an inclined rotatable member the rim of which contains spaced apart recesses which will separate broad beans or like seeds from the mass—as a rule singly—and convey said seeds to, and discharge them at, the hopper exit.

Figure 3 is a side view in vertical section, through part of a hopper in which is an inclined rotatable member which carries around its rim brushes which will separate from a mass small seeds, such as those of lettuce, raise them, and discharge them in small quantities at the hopper exit.

Figures 4 and 5 are perspective illustrations, as seen from gap entrance and exit (herein called outer and inner) points of view respectively, of a fragment of the seed conveying rim in Figure 1.

Figures 6 and 7 illustrate in perspective, as seen from the said outer and inner points of view respectively, one of the springs of the rim shown by Figures 4 and 5.

Figures 8 and 9 are perspective illustrations, as seen from outer and inner points of view respectively, of a fragment of the seed conveying rim in Figure 2.

Figures 10 and 11 illustrate in perspective as seen from outer and inner points of view respectively, one of the springs of the rim shown by Figures 8 and 9.

In each Figure 4, 5, 8 and 9, one spring is omitted to allow recess form to be clearly observed.

Figure 12 shows in side elevation a fragment of the seed conveyor of Figure 3.

Figures 13 and 14 show parts of a hopper where the latter is apertured for seed exit.

Figures 15 and 16 are perspective illustrations, as seen from outer and inner points of view respectively, of a fragment of the seed conveying rim adapted for sowing Green Feast pea and like seeds.

Figure 17 is an elevation of the hopper interior upper part fitted with a conveying rim mounted on a carrying wheel parts of which are shown.

Figure 18 shows in section part of the hopper at the seed exit with a seed ejector in the hopper.

In these drawings A indicates a seed container or hopper having a suitable upper part apertured for seed exit. The aperture $A^1$ is of suitable form and area, and seed is conveyed to it from a mass in the hopper.

The unrestricted hopper outlet as in Figure 2, suits for the sowing of large seeds. A part of the hopper corner is shown cut away and the outlet end is enlarged and has a slope $A^9$, to facilitate escape of such seeds as broad beans, the tendency of some of which to become jammed is thus overcome.

The area of aperture $A^1$ is variable, variations being made by the farmer at will. Thus in Figures 1, 13, a removable plate $A^3$ shown in broken lines in Figure 1, covers part of said aperture, leaving the aperture open at $A^4$. Plate $A^3$ can be held on the container by lugs $A^5$ and can be removed at will. In using the conveyors shown in Figure 16 it is appropriate to use reduced aperture $A^4$. In Figures 3 and 14 the aperture is made still smaller. Thus the outlet limiting means includes a shutter $A^6$ pivoted on a plate $A^7$ which closes aperture $A^1$ but has a small aperture $A^{11}$ which movement of the shutter reduces or enlarges. $A^8$ is a strap holding the shutter close to plate $A^7$.

The hopper can comprise connected parts; thus a body $A^2$ is shown attached to a base. Within the hopper is fitted an inclined rotatable seed conveyor constituted by one or other of a series of members having a hub $B^1$, central part B, and an interchangeable circular rim—the latter marked C in Figure 1, D in Figure 2, E in Figure 3, and Y in Figures 15 to 17, each rim C, D, and Y having spaced apart seed conveying recesses. Each rim has means to hold it in working position; thus Figure 17 shows internal rim slots M, fitted by lugs N on carrier B. For those who predetermine to sow two seeds together, such as two French beans, that is do not wish to sow singly, rim recesses may be provided each of suitably large capacity.

In Figures 1 to 3, and 17, I illustrate a central carrier to which is fitted at will, one or other of the separable seed conveying rims in which recesses for sowing the larger seeds have relatively large entrances and exits; such entrances are shown at the left of Figures 5, 9, and 16, and 17.

Rotation is provided for, by, for example, mounting on a spindle G—in Figure 2—a gear wheel H, and driving the latter. J is a sprocket wheel on shaft $J^1$, and is rotated in known manner. Shaft $J^1$ rotates in bearings $J^2$ on the implement frame $J^4$ and carries a wheel $J^3$ which drives wheel H. $H^1$ is a projection on spindle G and engages hub $B^1$ to drive wheel B which carries the rim. One of the ground wheels of the seed sowing implement could, by means of a sprocket and chain—not shown—drive the sprocket J in the well known manner. The speed of rotation of the seed conveying rim may be varied by obvious means, as by substituting a different sprocket.

An indicator illustrated in Figure 1 is provided to facilitate inclination of the rotating seed conveying member in a suitable oblique plane which may be varied from time to time during sowing so that seeds taken into the recesses will be securely raised and at the right time will fall out of them and out of the hopper. On some suitable support on the implement, shown as the end of axle $J^1$ a plumb or plate K, having a pivoted adjustable pointer $K^1$, is loosely suspended. The pointer is fixable by the user at will, $K^2$ being a nut-carrying bolt extending through a plumb slot $K^3$. This slot is shown marked or graduated to indicate various angles of obliquity which may guide a farmer usefully, according to the seed he decides to sow and according to the ground slope. Assuming that sowing occurs on level ground, with the pointer parallel to the plane of the rotating seed conveyor, then, upon the implement moving to sloping ground—as on to a hill side— that parallelism would cease, owing to the action of gravity on the plumb. The farmer could thereupon adjust the plane of the seed conveyor. To allow of adjusting the said plane, it is convenient to make the hopper adjustable, but it is obvious that various adjusting devices would act. L is a lever, of spring tooth type, mounted on the hopper which has framing $L^1$ pivoted on the shaft $J^1$. When the lever tooth is free, the hopper can be tilted into the position in which the tooth is set to hold it. This pivotal mounting of the hopper on the drive shaft is new, I believe.

By providing in different rims, seed gaps of different sizes, different sized seeds can be sown. Thus in Figures 8 and 9, assuming the gaps shown suit broad beans, then similar gaps of small capacities would be effective with peas which were not globular.

For sowing Canadian Wonder beans and French beans generally the recessed rim of Figures 1, 4 and 5 is suitable.

For sowing broad beans, the recessed rim of Figures 2, 8, and 9 is suitable. A mass O of large seeds such as broad beans is shown in the hopper of Figure 2, and one such seed is shown at $O^1$ in the position reached after it has been conveyed to the hopper exit and has entered the chute P, which has a wide mouth adjacent to aperture $A^1$. This chute leads to a receiver shown as tube R which can have any appropriate planting foot.

For sowing such seeds as Green Feast peas, the rim Y of Figures 15 and 16 is suitable. It has recesses marked Z on the entry side, and Z¹ on the exit side. Other similar seeds including globular kind of French beans, could be sown by using such a rim.

Such seeds as sometimes, for one special reason or another such as peculiar shape and size, dampness, or so on, do not readily pass into the chute on reaching it, are assisted to do so. Thus I fit in the container an impeller, or ejector shown as an arm $f$ its shank $f^1$ having a slot $f^2$ engaged by bolts $f^3$ which, when loose—see Figure 18— allow the shank to be adjusted to set the impeller tongue $f^4$ to enter each rim gap in turn, and bear on each seed when the latter is opposite the chute.

In Figures 4 and 5, each gap entrance has scalloped surfaces $S^2$, and the gap exit parts have pockets $S^1$. For larger seeds the rim of Figures 8 and 9 have wide entrances shown by sloping facets $T^1$.

Seeds from the mass enter gap mouths, then while being elevated pass deeper into, and reach the exit pockets $S^1$, $T^1$, where they remain till they enter the chute. A neck or narrowing exists between the inlet space for speed and the outlet space, see Figures 5 and 9.

Though the normal effect is to sow singly, yet two seeds occasionally become raised by one gap; yet only one of them may become sown, and the other may fall back into the mass. And occasionally seeds may travel beyond the hopper exit and drop back into the mass.

In Figure 3, some small seeds are shown at Q which, after they have been raised by the conveyor, have entered chute P. Such seeds might be cabbage, parsnip, onion, radish, beet, lettuce, turnip, or the like. To carry these small seeds, the rotatable rim E has adjustable spaced apart brushes F, see also Figure 12, which sweep seed up the hopper wall. The brushes can be adjustable, and be fixed at will. Thus each has a pivot $F^1$ and a bolt or projection $F^3$ entering a rim slot $F^2$. When the brush has been adjusted in a suitable position, the user can screw down a nut on bolt $F^3$ to fix it.

Seeds of one kind, such as broad beans, or French beans, differ in size, and those which are specially bulky may require for their reception and conveyance more capacious rim recesses than such as are adequate for the majority of such seeds. I provide rim gaps which have springs $a$ in Figures 4 and 5; and $b$ in Figures 8 and 9, see also Figures 6, 7, 10 and 11. These springs are attached to the rims by screws or the like W. Seeds entering the gaps move upon these springs, which yield as required to allow space for extra bulky seeds. A specially bulky seed, or an occasional plurality of seeds, by bearing down on a spring $a$ or $b$ of a gap in Figures 4, 5, 8, or 9, would make the spring yield to provide adequate space. Each spring $a$ or $b$ is attached to the rim as by a screw W the free end $a^1$ or $b^1$ being of any suitable form and resilient. End $a^1$ is shown with a guide slope or scallop and a seed bed $a^2$, and the end $b^1$ is a flange adjacent to a flange $b^2$.

As the farmer can set the seed carrier to nearly vertical to enable it to elevate and discharge seed, he can stop the sowing at will by adjusting the container handle.

I claim:—

1. In a seed sower, a container to receive a mass of seed, and having an elevated aperture for seed exit, an inclined rotatable member mounted within the container and provided with spaced apart peripheral recesses, each having on one face of said member an entrance space with a wide mouth into which seed will pass from the mass, each said entrance space being adjacent to a neck constituting an intermediate part communicating with an exit space open to the face of said rotatable member, into which exit space a seed will enter during the rotation of the rotatable member, and in which it will be conveyed to said aperture, the latter being adapted to allow the seed to fall into it from said exit space out of the container as set forth, and resilient members fitted in the seed spaces on the outlet side of the rotatable member adapted to yield under pressure by seed requiring extra space and thereby allow the spaces to receive said seed on the rotatable member to convey and discharge it substantially as described.

2. Construction according to claim 1, in which each of said resilient members comprising a spring attached to said rotatable member and having a part to support the seed during its conveyance to said outlet.

3. A seed sowing implement of the character described having a container to receive seed in the mass, an elevated seed outlet, an inclined rotatable member having edge gaps spaced apart to convey seed from the mass to the outlet, the said gaps each comprising an entrance space, a relatively narrow space, and a wide exit space, each exit space being fitted with a spring which will yield in the event of a bulky seed entering the exit space and requiring extra space.

4. A seed sowing implement comprising a frame, a cylindrical container adapted to accommodate a mass of seed, means for mounting said container on said frame with the cylindrical axis at an acute angle to the horizontal, said container having a floor with a seed outlet at the uppermost part thereof, a seed feeding member coaxially mounted within said container above said floor and provided with a series of peripheral recesses adapted to accommodate single seeds therein, means for rotating said member to advance said recesses successively through said mass of seeds and then to and past said seed outlet, and yieldable mean in each recess for normally delimiting the size of said recess to prevent the accommodation of more than a single seed, the yieldability of said means nevertheless permitting the accommodation of a seed larger than normal.

GEORGE WILLIAM WAKEHAM.